Figure 1:
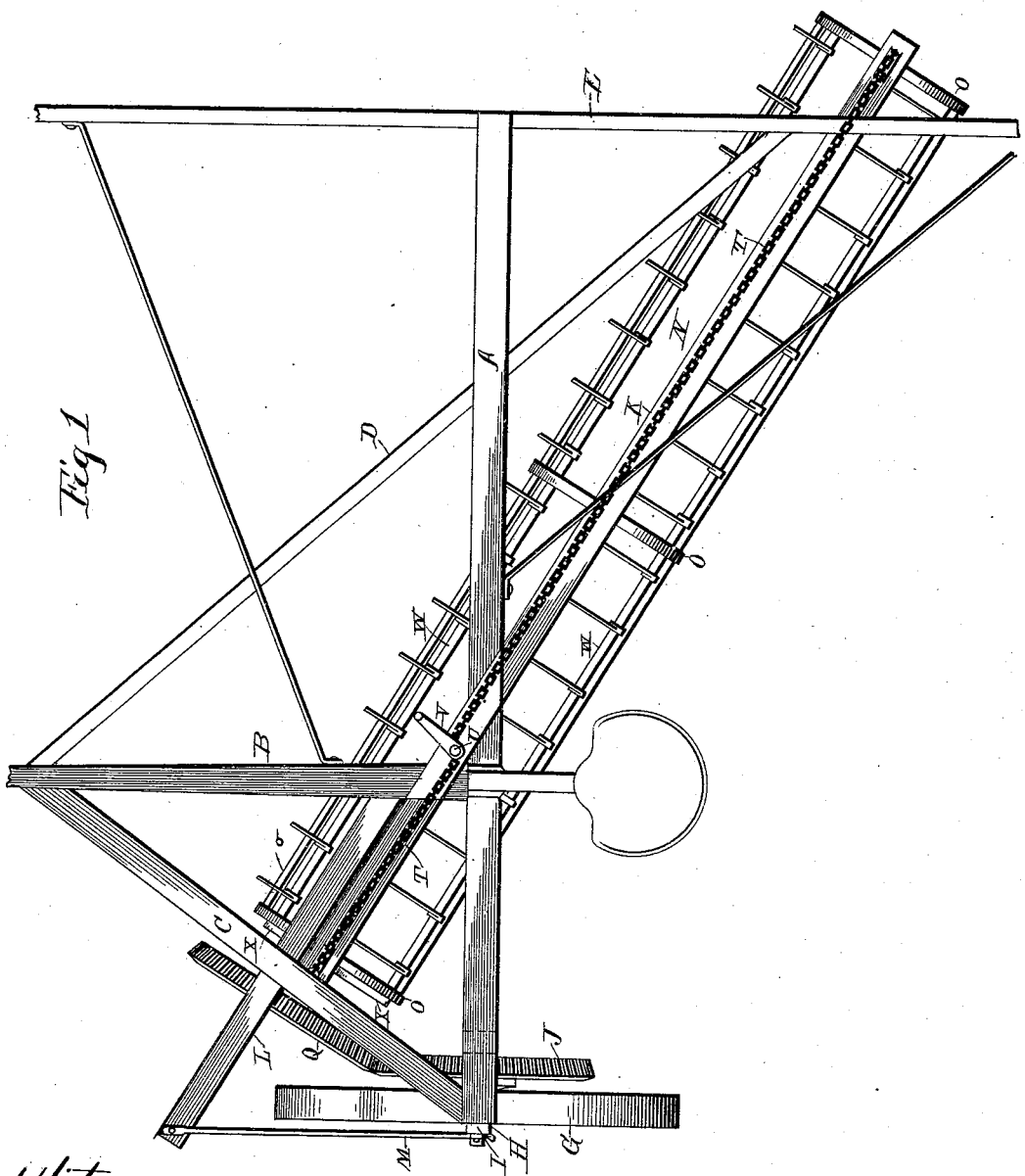

(No Model.) 3 Sheets—Sheet 1.

W. R. MANN.
HORSE HAY RAKE.

No. 471,648. Patented Mar. 29, 1892.

Witnesses
C. C. Burdine
James T. Durbin

Inventor
William R. Mann,
per
R. G. Du Bois
atty.

(No Model.) 3 Sheets—Sheet 2.
W. R. MANN.
HORSE HAY RAKE.
No. 471,648. Patented Mar. 29, 1892.
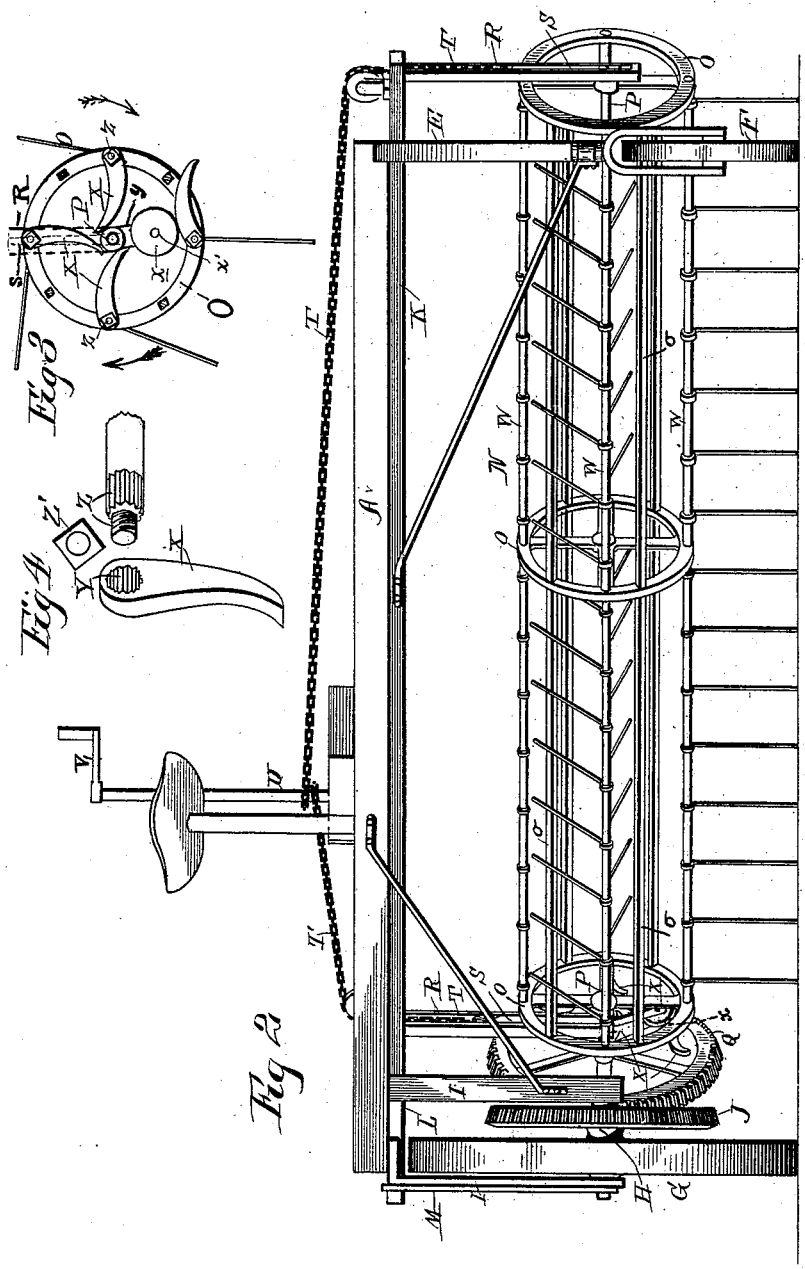
Witnesses
C. C. Burding
James T. DuBois
Inventor
William R. Mann
per R. L. DuBois
his atty

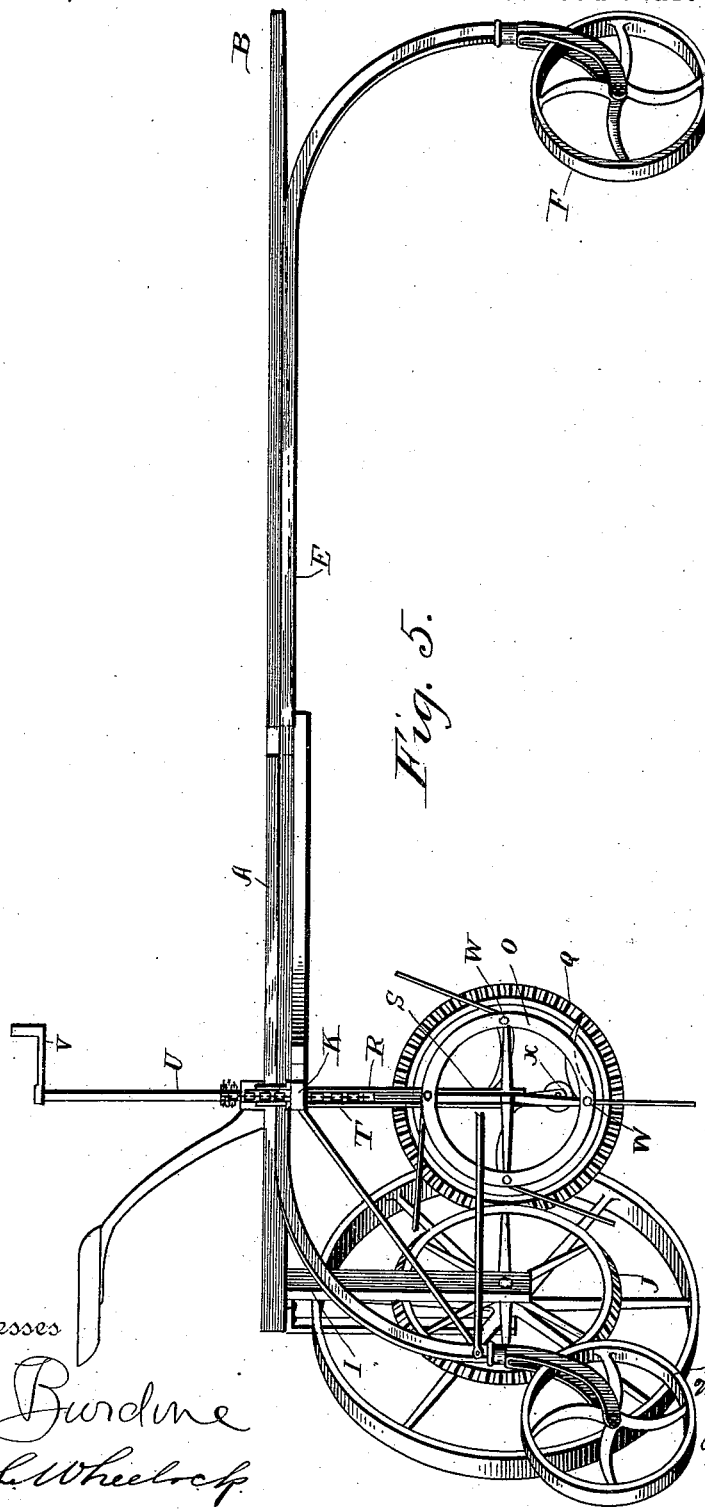

United States Patent Office.

WILLIAM R. MANN, OF EARLVILLE, ILLINOIS.

HORSE HAY-RAKE.

SPECIFICATION forming part of Letters Patent No. 471,648, dated March 29, 1892.

Application filed October 21, 1890. Serial No. 368,811. (No model.)

*To all whom it may concern:*

Be it known that I, WILLIAM R. MANN, a citizen of the United States, residing at Earlville, in the county of La Salle and State of Illinois, have invented certain new and useful Improvements in Hay-Rakes; and I do hereby declare the following to be a full, clear, and exact description of the invention, such as will enable others skilled in the art to which it appertains to make and use the same.

My present invention relates to horse hay-rakes, and has for its object to improve upon the construction disclosed in my former patent, No. 425,618, dated April 15, 1890, and more thoroughly and effectively accomplish the results sought for—viz., the delivery of the hay at one side of the rake in a continuous windrow parallel with the path of the machine by a single uninterrupted process.

A further object is to so construct the rake that it will gather up the hay without dirt or litter and convey it all to one side, leaving a clean path.

With these ends in view my invention consists in certain peculiarities of construction and combinations of parts more fully set forth hereinafter, and pointed out in the claim.

Referring to the accompanying drawings, Figure 1 is a plan view of my complete structure; Fig. 2, an elevation; and Figs. 3 and 4 are views of details. Fig. 5 is a side view of my machine.

The frame of the machine consists of the axle-tree A, the tongue B, extending at right angle therefrom, and the braces C and D. A bowed supporting-bar E is connected at its center to the axle-tree, and in the opposite ends of the bar are mounted caster-wheels F, which support one end of the machine. At one end of the axle the drive-wheel G is mounted upon a short shaft H, supported by uprights I, depending from the axle-tree A, and upon this shaft is also mounted a beveled gear-wheel J, in somewhat the same manner and for the same purpose as shown in my previous patent. The structure is further strengthened or braced by a long bar or beam K, which extends diagonally across the axle, reaching from the brace C to the bowed end bar E, and a shorter auxiliary bar L is also provided, which extends parallel with said bar K, and connects the tongue and the brace C, and projects out beyond the latter, its end being connected by a rod M to the outer extremity of the axle-tree. The revolving reel N is suspended beneath the long brace-rod K, thus lying diagonally across the axle, and said reel is formed of a number of disks O, connected by rigid bars o, and which are rigidly mounted on the shaft P, which also carries bevel-gear Q, adapted to mesh with the gear J on the drive-wheel shaft. The opposite ends of the shaft P are supported in the U-shaped brackets or hangers R, which depend from the rod K, and said shaft is journaled in boxes S, which are vertically movable within supporting-brackets R and are connected at their upper ends to the hoisting-chains T, which run up over suitable pulleys to the middle portion of the machine and are connected to the short shaft U, located near the seat and provided with a crank-handle V in easy reach from the latter. Upon turning the handle, the chains will be wound and unwound on said shaft, and thus will act to raise and lower the reel and throw the bevel-gear of the same in and out of engagement with that on the drive-wheel shaft. A number of long rods or rock-shafts W, preferably four in number, are journaled in the disks O and carry the rake-teeth, which are rigidly connected to them and arranged in suitable numbers to properly do the work. On one end of each of said rock-shafts, outside the end disks of the reel, are fastened stems or curved arms X, each of which is secured on its respective shaft and rendered adjustable to different angles by having a corrugated or ratchet-faced opening Y, which engages a similarly-formed head Z, rigid on the shaft, and is held in place by a nut z'. A roller x, forming a cam, is arranged adjacent to the disk O near the periphery of the same and is mounted on a pin x' on the end of the arm y, the latter being fixed on its upper end to the adjustable box S, and the length of said arm is such that the roller will engage the stems of the rock-shafts as they come around and act to hold the teeth to their proper positions for raking after they have fallen out by their own weight.

The preferred construction of my machine having now been set forth, I will next proceed to describe its operation: When the reel has been let down so that its shaft has found a bearing in the lower ends of the U-shaped hangers, its gear-wheel will be meshing with the bevel-gear J on the drive-wheel shaft, and hence the forward movement of the machine causes the backward revolution of the reel. Now, it will be seen that as the reel revolves the rake-teeth will fall out as they approach the ground, assuming the position shown more clearly in Fig. 3, and the stem $x$ of the rod carrying the teeth having passed under the roller they will be held in vertical position and will act upon the hay. After the stem has passed the roller and as the reel continues to revolve the teeth as they are carried upward are prevented from moving too far inward by the stems $x$, which come against the shaft P, and thus the teeth are held out from the shaft ready to tip when they come to the rear of the reel. Each set of teeth acts in this way as they come around, and will thus rake up the hay cleanly, leaving the litter and dirt. The diagonal position of the reel across the axle will cause the hay to be carried to one side as it is raked up, and it will be discharged from the rear of the machine beneath the arched cross-piece. Thus by one uninterrupted process the hay is cleanly raked up and carried off to one side, forming an even continuous windrow parallel to the path traveled by the machine.

It is evident that my invention could be varied in many slight ways which might suggest themselves to a skilled mechanic, and hence I do not wish to confine myself to the precise construction herein shown, but consider myself entitled to all such slight changes as come within the spirit and scope of my invention.

Having thus described my invention, what I claim as new, and desire to secure by Letters Patent, is—

In a wheeled hay-rake, a revolving frame or reel journaled in boxes adjustable in brackets, having a number of rock-shafts parallel with the axis of the reel, and provided with raking teeth, said shafts having curved stems upon one end, in combination with a roller suspended from one of the boxes, which engages the stems and actuates the rock-shafts, all arranged to operate in the manner and for the purpose set forth.

In testimony whereof I affix my signature in presence of two witnesses.

WILLIAM R. MANN.

Witnesses:
  S. W. DAMOND,
  J. H. REESE.